United States Patent
Kamlet et al.

(10) Patent No.: US 8,737,600 B2
(45) Date of Patent: May 27, 2014

(54) SKILLS-BASED COMMUNICATION ROUTING

(75) Inventors: Michael Kamlet, Chicago, IL (US); Christopher C. Baker, Livermore, CA (US); Robert J. Hinckley, Hubertus, WI (US); Daniel Whitecotton, Arlington Heights, IL (US); Yvette E. Aparicio, Forest Park, IL (US); Alfonso G. Camacho, Rodeo, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1366 days.

(21) Appl. No.: 11/972,328

(22) Filed: Jan. 10, 2008

(65) Prior Publication Data

US 2009/0180607 A1 Jul. 16, 2009

(51) Int. Cl.
*H04M 3/523* (2006.01)

(52) U.S. Cl.
USPC .................... 379/266.01; 379/265.11

(58) Field of Classification Search
USPC ........................ 379/265.1–265.14
See application file for complete search history.

(56) References Cited

U.S. PATENT DOCUMENTS

| | | | | |
|---|---|---|---|---|
| 5,206,903 A * | 4/1993 | Kohler et al. | ............ | 379/265.12 |
| 5,274,700 A * | 12/1993 | Gechter et al. | ........... | 379/211.01 |
| 5,335,269 A * | 8/1994 | Steinlicht | ................. | 379/266.05 |
| 6,088,441 A * | 7/2000 | Flockhart et al. | ........ | 379/265.12 |
| 6,192,122 B1 * | 2/2001 | Flockhart et al. | ........ | 379/266.01 |
| 6,577,727 B1 * | 6/2003 | Hymel | ..................... | 379/265.05 |
| 7,372,952 B1 * | 5/2008 | Wu et al. | .................. | 379/220.01 |
| 2003/0026409 A1 * | 2/2003 | Bushey et al. | ........... | 379/211.02 |
| 2004/0062379 A1 * | 4/2004 | O'Neil | ..................... | 379/265.01 |
| 2005/0129214 A1 * | 6/2005 | Tyagarajan et al. | ...... | 379/265.04 |

* cited by examiner

*Primary Examiner* — Ahmad Matar
*Assistant Examiner* — Jirapon Intavong
(74) *Attorney, Agent, or Firm* — Greenblum & Bernstein, P.L.C.

(57) ABSTRACT

A skills-based method for routing an incoming communication includes determining a task associated with the incoming communication. The method also includes routing the incoming communication, based on the task, to be serviced by a pool of selected agents. The pool of selected agents includes agents from a first virtual group. The method further includes adding agents from a second virtual group to the pool of selected agents when the incoming communication has not been serviced before a waiting time exceeds a predetermined time.

16 Claims, 6 Drawing Sheets

SKILLS-BASED COMMUNICATION ROUTING

BACKGROUND OF THE DISCLOSURE

1. Field of the Disclosure

The present disclosure relates to skills-based communication routing. More particularly, the present disclosure relates to adding agents to a pool of selected agents based on a skill level for accomplishing a task associated with a call and based on an estimated wait value for an available agent.

2. Background Information

Organizations operate call centers to enable interaction with customers placing calls to the organization. Examples of organizations that use call centers include utility and mail order catalog companies as well as companies that offer technology products and services. A call center processes a volume of call traffic by servicing requests made by callers. These requests may be directed to product information, billing inquiries, modifying a customer's preferences and technical support for products offered by the organization. Call traffic is processed by routing calls to a group of call center agents that service requests associated with each call. Calls are subsequently queued and scheduled for servicing by a particular agent in the group.

Call centers need to effectively route calls to agents to reduce the amount of time a caller must wait before their request is serviced. Calls are routed to agents based on an estimated waiting time for servicing requests. More particularly, calls are routed to an agent for which the estimated waiting time is the shortest. If the agent has a relatively few number of calls waiting in queue or if the agent is able to process calls faster than other agents, the estimated waiting time for the agent is shorter.

BRIEF DESCRIPTION OF THE DRAWINGS

The present disclosure is further described in the detailed description that follows, by reference to the noted drawings by way of non-limiting examples of embodiments of the present disclosure, in which like reference numerals represent similar parts throughout several views of the drawing, and in which.

DETAILED DESCRIPTION

Figure 1:
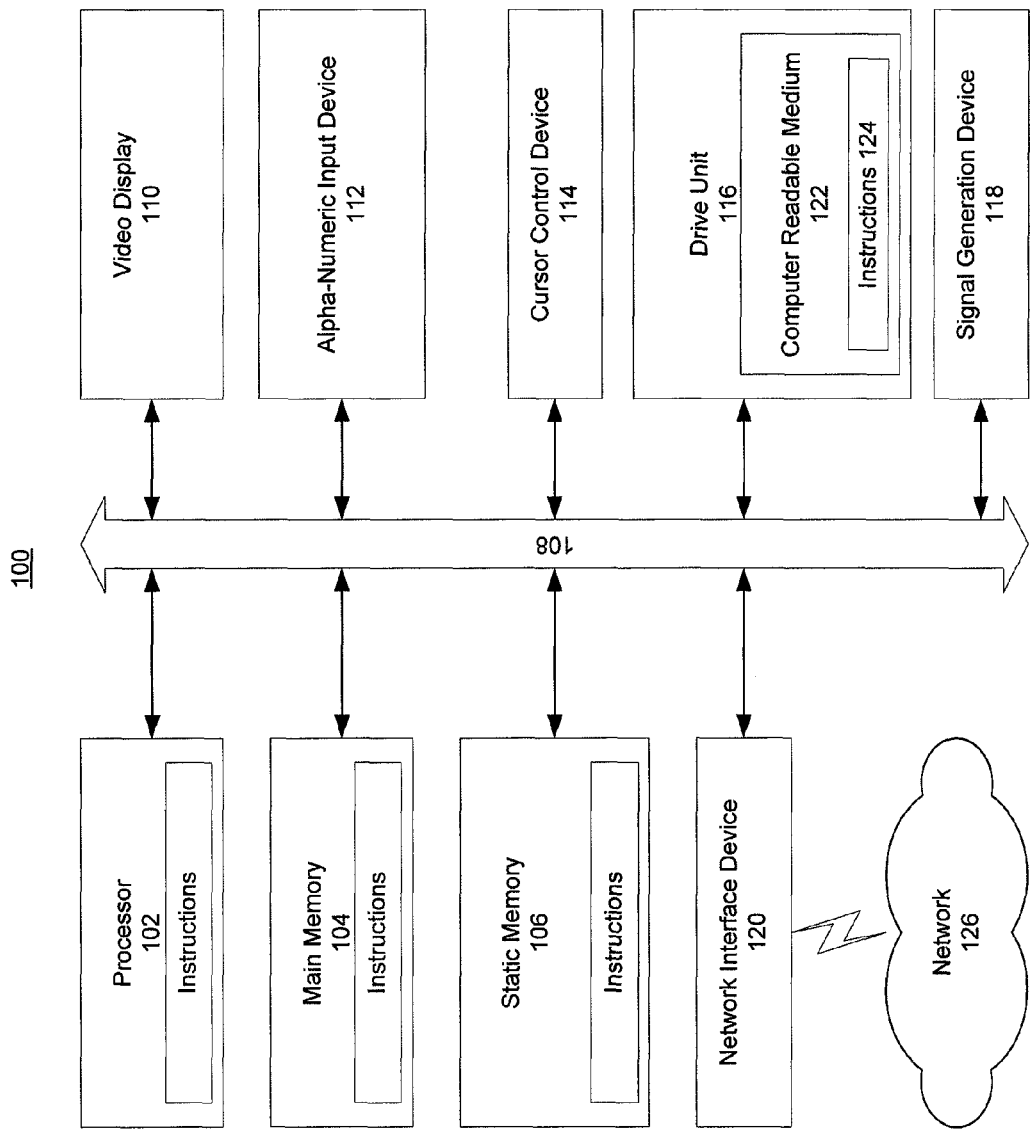
FIG. 1 illustrates an embodiment of a general computer system for skills-based communication routing.

According to one aspect of the present disclosure, a skills-based method for routing an incoming communication includes determining a task associated with the incoming communication. The method further includes routing the incoming communication, based on the task, to be serviced by a pool of selected agents including agents from a first virtual group. The method also includes adding agents from a second virtual group to the pool of selected agents when the incoming communication has not been serviced before a waiting time for servicing the incoming communication exceeds a predetermined time.

According to another aspect of the present disclosure, the predetermined time is based on the task.

According to yet another aspect of the present disclosure, the predetermined time is different for each virtual group.

According to a further aspect of the present disclosure, the method also includes adding agents from a third virtual group to the pool of selected agents when the incoming communication has not again been serviced before a reset waiting time for servicing the incoming communication exceeds the predetermined time.

According to another aspect of the present disclosure, an available agent from the pool of selected agents services the incoming communication.

According to a further aspect of the present disclosure, the first virtual group includes agents assessed to have a first skill level in accomplishing the task.

According to one aspect of the present disclosure, the second virtual group includes agents assessed to have a second skill level in accomplishing the task.

According to another aspect of the present disclosure, agents included in the second virtual group are less skilled than agents included in the first virtual group in accomplishing the task.

According to yet another aspect of the present disclosure, the third virtual group includes agents assessed to have a third skill level in accomplishing the task.

According to a further aspect of the present disclosure, the agents included in the third virtual group are less skilled in accomplishing the task than agents included in the first virtual group and agents included in the second virtual group.

According to one aspect of the present disclosure, agents included in a protected virtual group are excluded from being added to the pool of selected agents.

According to another aspect of the present disclosure, the agents included in a protected virtual group are fewer than a threshold and the protected virtual group includes agents of a protected skill.

According to one aspect of the present disclosure, the agents of the protected skill are assessed to have a first skill level with respect to accomplishing a second task.

According to yet another aspect of the present disclosure, the predetermined time is zero and the waiting time is skipped.

According to a further aspect of the present disclosure, the waiting time is skipped based on the task.

According to another aspect of the present disclosure, the method also includes determining a service priority for the incoming communication.

According to a further aspect of the present disclosure, the incoming communication is serviced by an available agent from the pool of selected agents based on the service priority.

According to one aspect of the present disclosure, a system for routing an incoming communication includes a receiver that receives an incoming communication. The system also includes a task processor that determines a task associated with the incoming communication. The system also includes a skills-based routing logic processor that determines a pool of selected agents including agents assessed to have a first skill level to service the incoming communication based on the task. The skills-based routing logic process also adds agents assessed to have a second skill level to the pool of selected agents when the incoming communication has not been serviced before a waiting time for servicing the incoming communication exceeds a predetermined time.

According to another aspect of the present disclosure, the incoming communication includes one of a telephone call, a facsimile, an electronic mail, an internet posting, a chat client message, an offline message and a short messaging system (SMS) message.

According to yet another aspect of the present disclosure, the incoming communication is received via a mode of communication including one of telephony, wireless communication, internet communication and cellular communication.

According to a further aspect of the present disclosure, the system also includes a graphical user interface (GUI) that is used by a user of the system to set the predetermined time.

According to yet another aspect of the present disclosure, a tangible computer readable medium that stores a program for skills-based routing for accomplishing a task associated with an incoming communication includes a determining code to determine the task associated with the incoming communication. The medium also includes a routing code to route the incoming communication, based on the task, to be serviced by a pool of selected agents including agents assessed to have a first skill level from a first virtual group. The medium further includes an adding code to add agents assessed to have a second skill level from a second virtual group to the pool of selected agents when the incoming communication has not been serviced before a waiting time for servicing the incoming communication exceeds a predetermined time.

FIG. 1 illustrates an embodiment of a general computer system. The computer system 100 can include a set of instructions that can be executed to cause the computer system 100 to perform any one or more of the methods or computer based functions disclosed herein. The computer system 100 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 102, e.g., a central processing unit (CPU), a graphics processing unit (GPU), or both. Moreover, the computer system 100 can include a main memory 104 and a static memory 106, that can communicate with each other via a bus 108. As shown, the computer system 100 may further include a video display unit 110, such as a liquid crystal display (LCD), an organic light emitting diode (OLED), a flat panel display, a solid state display, or a cathode ray tube (CRT). Additionally, the computer system 100 may include an input device 112, such as a keyboard, and a cursor control device 114, such as a mouse. The computer system 100 can also include a disk drive unit 116, a signal generation device 118, such as a speaker or remote control, and a network interface device 120.

In a particular embodiment, as depicted in FIG. 1, the disk drive unit 116 may include a computer-readable medium 122 in which one or more sets of instructions 124, e.g. software, can be embedded. Further, the instructions 124 may embody one or more of the methods or logic as described herein. In a particular embodiment, the instructions 124 may reside completely, or at least partially, within the main memory 104, the static memory 106, and/or within the processor 102 during execution by the computer system 100. The main memory 104 and the processor 102 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 124 or receives and executes instructions 124 responsive to a propagated signal, so that a device connected to a network 126 can communicate voice, video or data over the network 126. Further, the instructions 124 may be transmitted or received over the network 126 via the network interface device 120.

Figure 2:
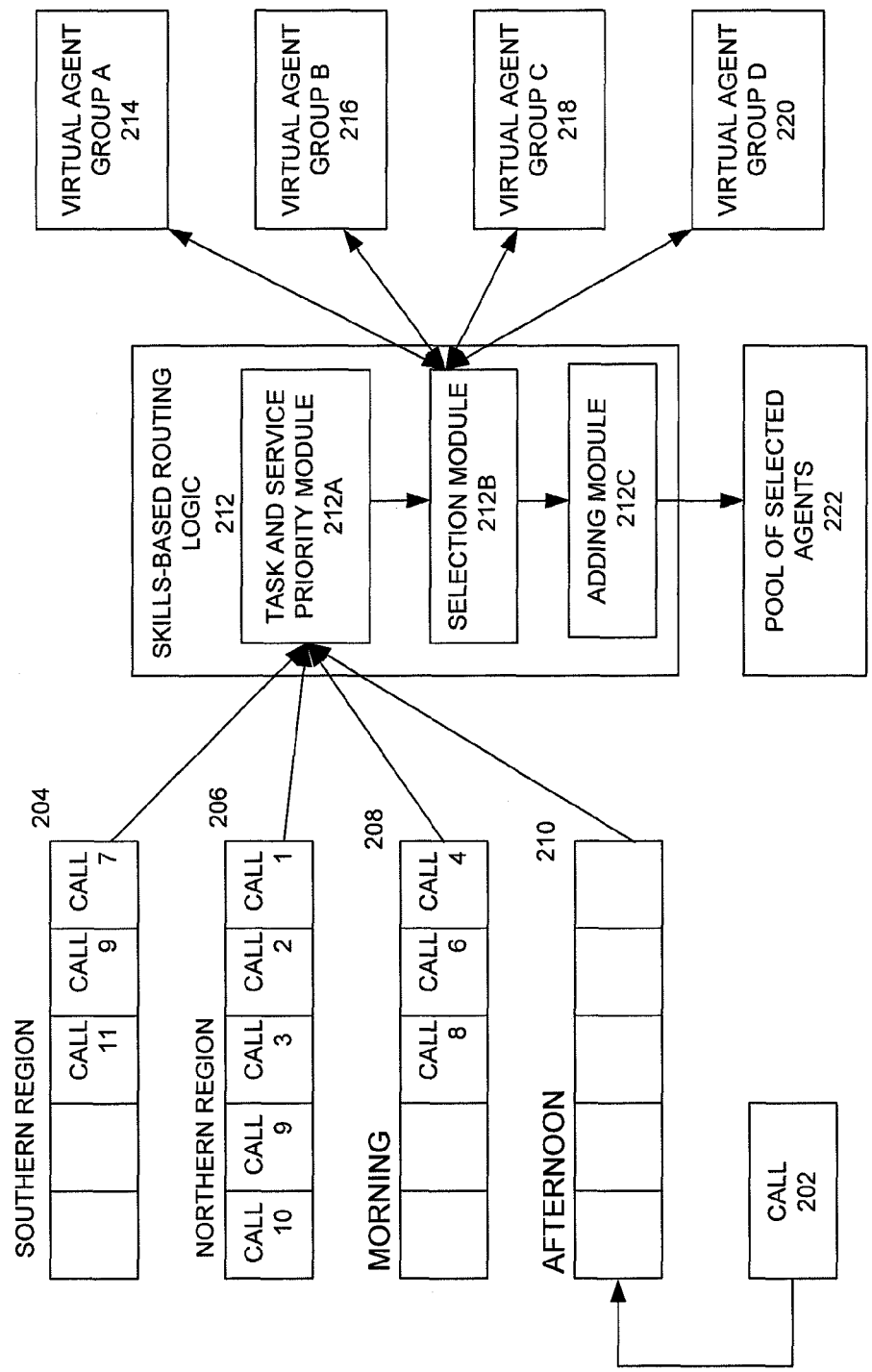
FIG. 2 illustrates a process flow diagram for skills-based communication routing.

FIG. 2 shows a system diagram of the present disclosure. System 200 includes call 202 that is placed in one of several queues 204, 206, 208 and 210. Calls are differentiated among queues 204, 206, 208 and 210 based on call characteristics. For example, a call characteristic includes the state where the call originates from or the time in which the call is received. In an exemplary embodiment, queue 204 stores calls originating from a southern region of a coverage area, queue 206 stores calls originating from a northern region of the coverage area, queue 208 stores calls received in the morning, and queue 210 stores calls received in the afternoon. Queues 204, 206, 208 and 210 are part of a single call processing arrangement.

Calls stored in queues 204, 206, 208 and 210 are provided to skills-based routing logic 212 in which a task and a service priority for call 202 is determined by task and service priority module 212A. A task associated with a call is an action to be accomplished in servicing the call. For example, the task may include disputing a bill, ordering a new service, configuring a product or paying a bill by telephone. In the exemplary embodiment, the task is to pay a bill by telephone.

Selection module 212B of skills-based routing logic 212 selects a virtual agent group from virtual agent group A 214, virtual agent group B 216, virtual agent group C 218 and virtual agent group D 220. In the exemplary embodiment, virtual agent group A 214 includes a group of billing agents, virtual agent group B 216 includes a group of order processing agents, virtual agent group C 218 includes a group of account management agents and virtual agent group D 220 includes a group of technical support agents. Selection module 212B of skills-based routing logic 212 selects virtual agent group A 214 based on the task, the service priority and an estimated wait value for accomplishing the task, and adds virtual agent group A 214 to pool of selected agents 222. That is, virtual agent group A 214 includes billing agents, who have a highest degree of ability to accomplish the task of paying a bill by telephone. Billing agents included in virtual agent group A 214 are designated as having a first skill level, with respect to the task of paying a bill by telephone.

Based on the waiting time for servicing call 202 by an agent in virtual agent group A 214, selection module 212B of skills-based routing logic 212 selects virtual agent group C 218 to add to the pool of selected agents 222. Adding module 212C adds virtual agent group C 218 to the pool of selected agents 222. Agents included in virtual agent group C 218 have a second level of skill in the accomplishing the task that is less than the first level of skill in agents in virtual agent group A 214. With respect to the exemplary task, billing agents in virtual agent group A 214 have a higher degree of ability than account management agents in virtual agent group C 218 in accomplishing the task of paying a bill by telephone. However, account management agents in virtual agent group C 218 have a higher degree of ability than order processing agents in virtual agent group B 216, in accomplishing the task of paying a bill by telephone. Account management agents in virtual agent group C 218 are designated as having a second skill level and order processing agents in virtual agent group B 216 are designated as having a third skill level with respect to accomplishing the task. Technical support agents in virtual agent group D 220 have the least degree of ability in paying a bill by telephone and thus, are designating as having a fourth skill level.

If the waiting time for servicing call 202 by an agent from virtual agent group A 214 is greater than a threshold, agents from virtual agent group C 218 are added to the pool of selected agents 222 by adding module 212C. Adding to the pool of selected agents 222 decreases the waiting time for call 202 to be serviced.

Figure 3:
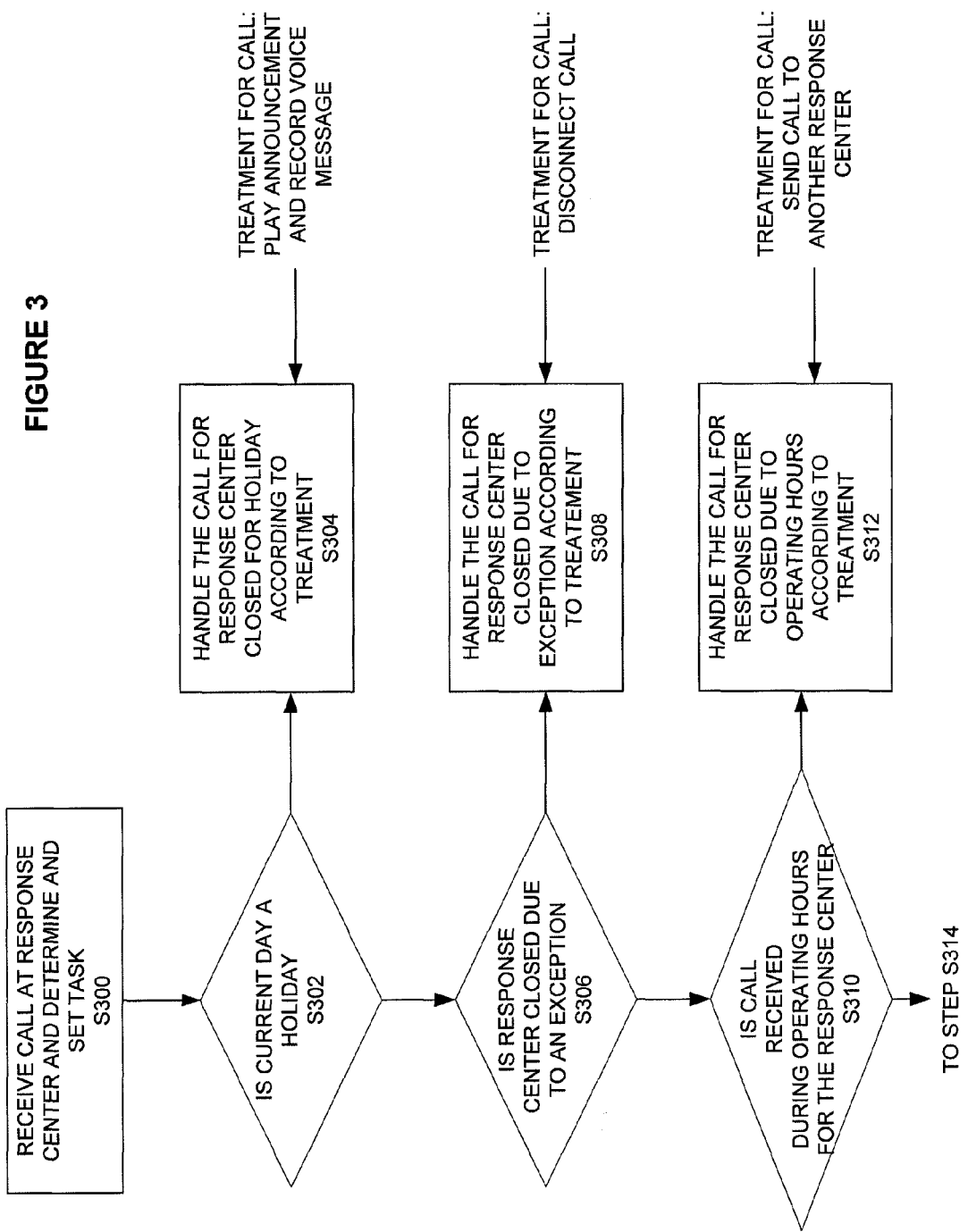
FIG. 3 illustrates a process flow diagram for routing a call based on the operating status of a response center.

FIG. 3 shows a process flow diagram for routing a call based on the operating status of a response center. In step S300, a call is received at the response center and the task associated with the call is determined and set. In step S302, a determination is made as to whether the current day is a holiday. If the current day is a holiday, the process proceeds to step S304 in which the call receives a treatment for the response center being closed due to a holiday. A treatment is a type of action taken with respect to the call. For example, the call may be disconnected, routed to an agent, acted upon in accordance with a rule or routed to an overflow center. The treatment for the call, provided as input to step S304, is to use a custom rule to take action with respect to the call, which is provided as an input to step S304. For example, the custom rule may specify a message to be played instructing the caller to call back at a later time and allowing the caller to leave a voicemail message. If it is determined in step S302 that the current day is not a holiday, the process proceeds to step S306.

If it is determined, in step S306, that the response center is closed due to an exception, the process proceeds to step S308 in which the call receives a treatment for the response center being closed due to an exception. As an example, the exception may include a fire or natural disaster affecting the response center. Input provided to step S308 indicates that the treatment is to disconnect the call. If the response center is not closed due to an exception, a determination is made as to whether the time in which the call is received is during operating hours for the response center in step S310. If it is determined in step S310 that the call is received during operating hours for the response center, the process proceeds to step S314 shown in FIG. 4. Otherwise, the process continues to step S312 in which the call receives a treatment for the response center being closed due to operating hours. A treatment for the call received outside of operating hours is to forward the call to another response center, based on input provided to step S312.

Figure 4:
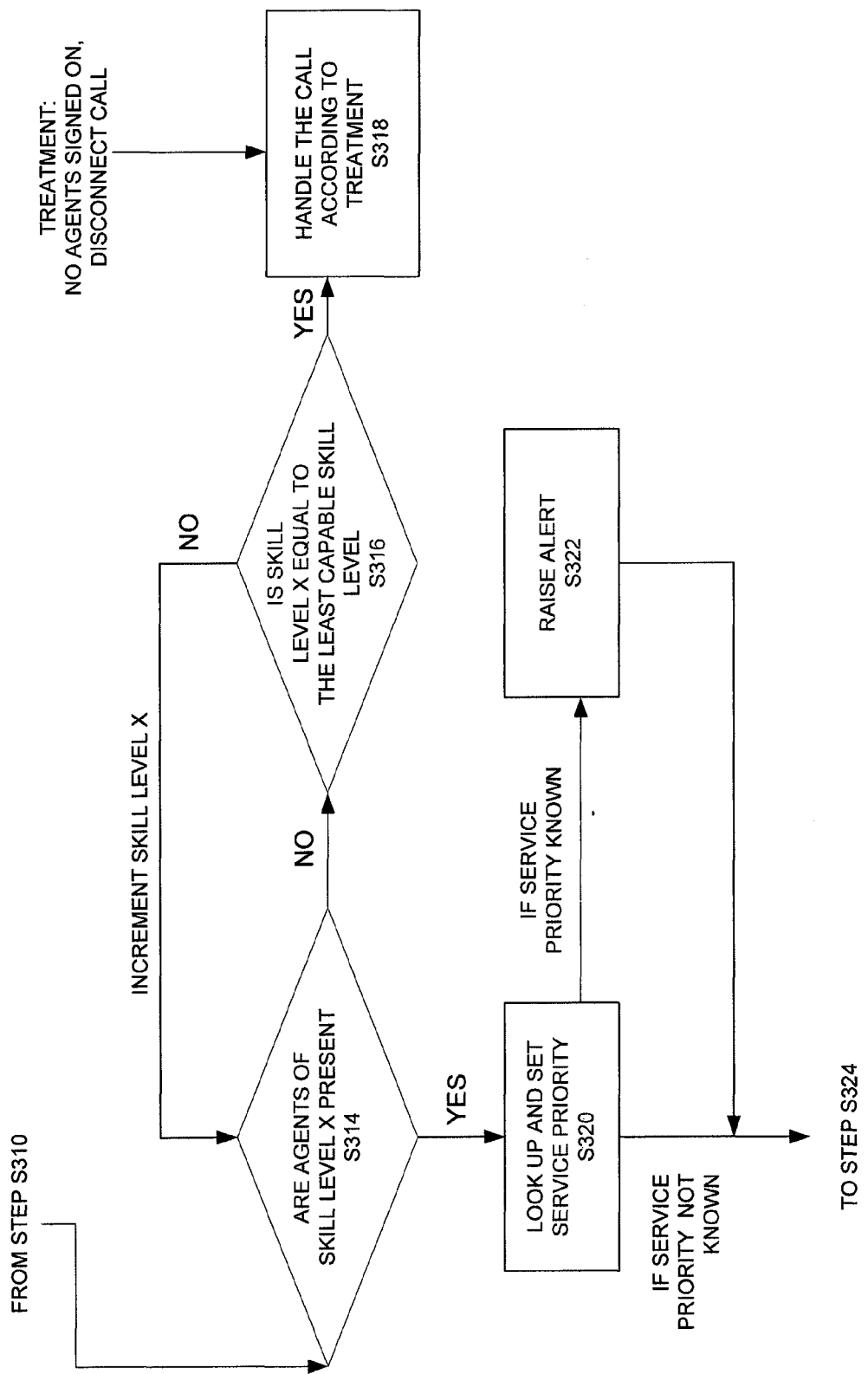
FIG. 4 illustrates a process flow diagram for eliciting the presence of agents.

FIG. 4 shows a process flow diagram for eliciting the presence of agents. The process continues from step S310 in FIG. 3 to step S314 in which it is determined whether agents of a particular skill level, X, are present. If no agents of skill level X are present, a determination is made in step S316 as to whether the current skill level X is equal to the least capable skill level. A least capable skill level is indicative of a least degree of ability to accomplish the task. If it is determined that the current skill level X is not the least capable skill level, the current skill level X is incremented and process returns to step S314. Otherwise, no agents are present to service the call. The process ends in step S318 and the call is handled according to the treatment for no agents present. The treatment may include disconnecting the call or routing the call to another response center. The process repeats until agents are present for the current skill level X, in which time the process continues to step S320. In step S320, the service priority for the call is obtained and the process continues to step S324. The process continues to step S322 if the service priority for the call is not found. More particularly, an alert is raised in step S322. The process continues to step S324.

Figure 5:
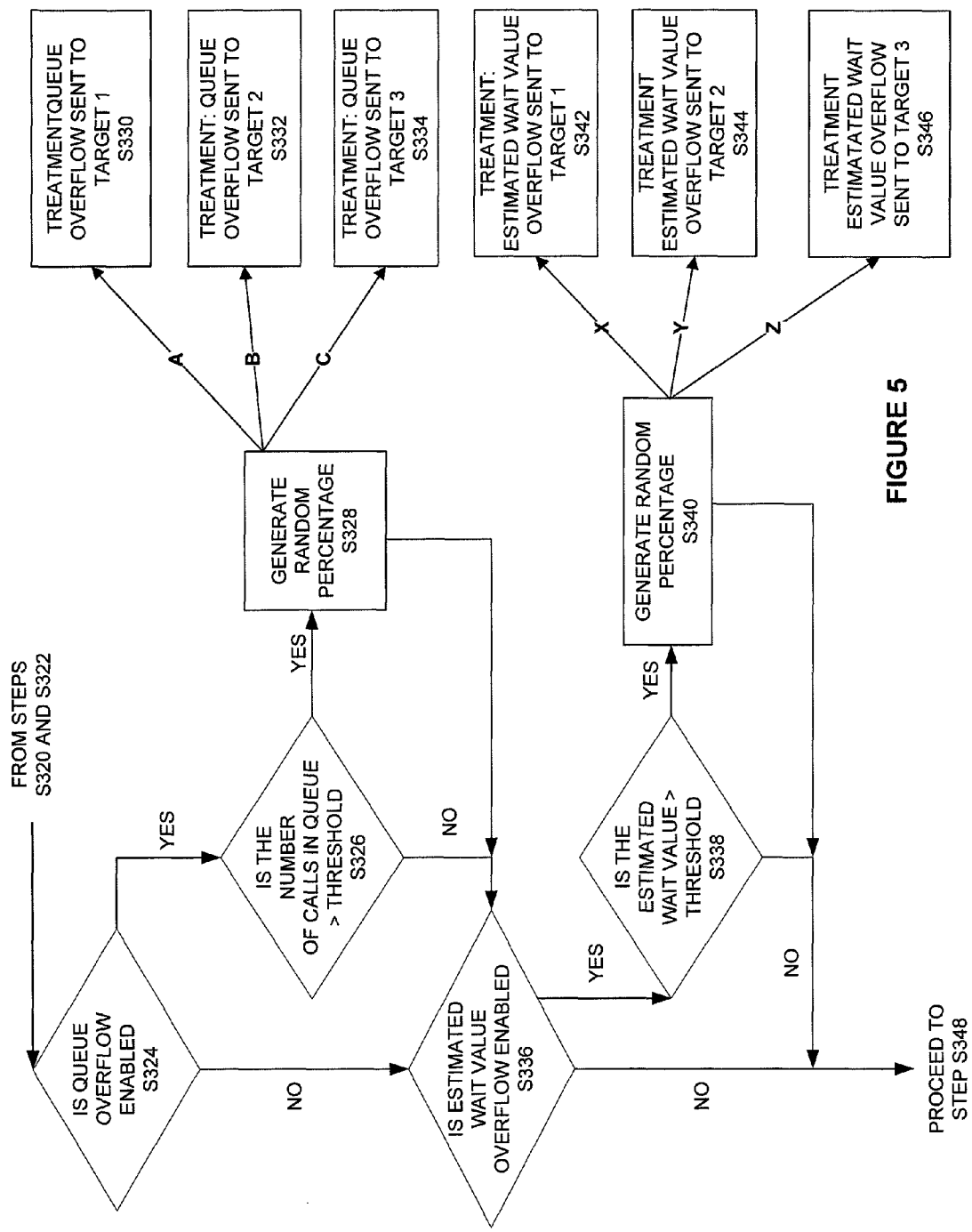
FIG. 5 illustrates a process flow diagram for routing an overflow call.

FIG. 5 shows a process flow diagram for routing an overflow call. In step S324, a determination is made as to whether queue overflow is enabled. If procedures for handling queue overflow are enabled and the number of calls in the queue is greater than a threshold as determined in step S326, the process continues to step S328. That is, in step S326, it is determined whether the queue in which the call is placed is overflowing or will overflow. Procedures for handling queue overflow include routing the call to a target. In the exemplary embodiment, a target is an alternate response center. The response center may be configured such that varying percentages of call traffic are routed to each target. In the exemplary diagram, A=10%, B=20% and C=30%. Thus, in the exemplary embodiment, 60% of overflow call traffic is routed to alternate response centers. The remaining 40% of call traffic is returned to the response center. A random percentage is generated in step S328. If the random percentage falls within the range of 0-10%, the process continues to step S330 in which the call is routed to target 1. If the random percentage falls within the range of 11%-30%, the process continues to step S332 in which the call is routed to target 2. If the random percentage falls within the range of 31%-60%, the process continues to step S334 in which the call is routed to target 3. If the random percentage falls within the range of 61%-100%, the process continues to step S336 in which the call is returned to the call flow for the response center.

If procedures for handling queue overflow are not enabled in step S324 or the number of calls in the queue is less than or equal to the threshold in step S326, or the call is returned to the call flow for the response center in step S328, the process continues to step S336. In step S336, a determination is made as to whether there are procedures for routing a call for which an estimated wait value is greater than a threshold. The estimated wait value is based on an average speed for agents accomplishing the task. In step S338, it is determined whether the estimated wait value is greater than a threshold. If the estimated wait value is determined to be greater than a threshold in step S338, a random percentage is generated in step S340.

In the exemplary diagram, X=5%, Y=10% and Z=5%. If the random percentage falls within the range of 0-5%, the process continues to step S342 in which the call is routed to target 1. If the random percentage falls within the range of 6%-15%, the process continues to step S344 in which the call is routed to target 2. If the random percentage falls within the range of 16%-20%, the process continues to step S346 in which the call is routed to target 3. If the random percentage falls within the range of 21%-100%, the call is returned to the call flow for the response center. If the call is returned to the call flow or if no procedures exist for handling estimated wait value overflow, the process proceeds to skills-based routing in step S348.

Figure 6:
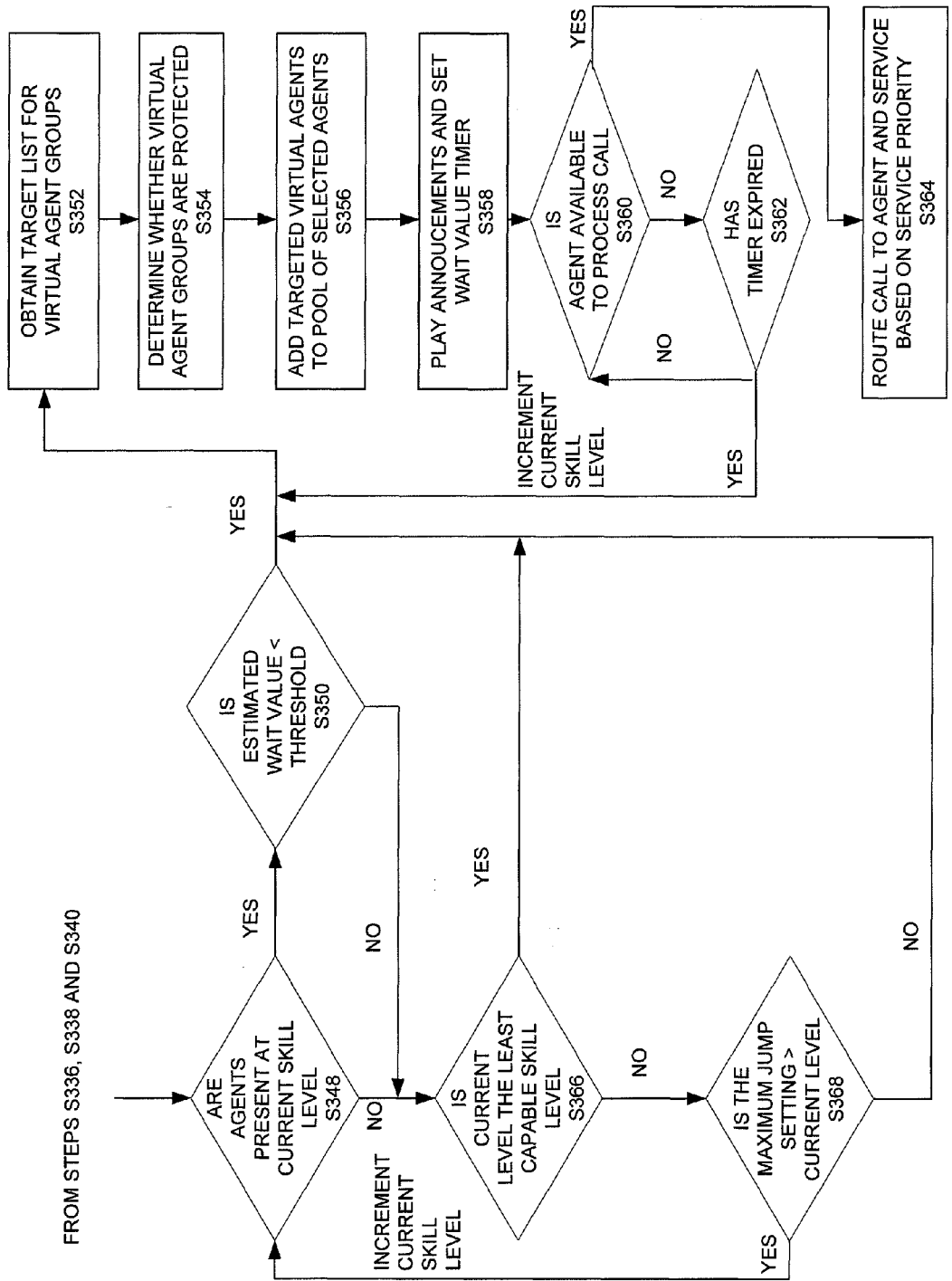
FIG. 6 illustrates a process flow diagram for selecting agents for skills-based communication routing.

FIG. 6 shows a process flow diagram for skills-based routing of the call. In step S348 it is determined whether agents having a current skill level are present. If it is determined that agents having the current skill level are present, the process continues to step S350 in which an estimated wait value for servicing the call by an agent having the current skill level is compared to a threshold. If the estimated wait value is less than the threshold, the process continues to step S352 in which a virtual agent group that includes agents having the current skill level is obtained. In addition, virtual agent groups that include agents having skill levels higher than the current skill level are also obtained. In addition, a target list for each of the virtual agent groups are also obtained, in step S352. The target list includes agents to which the call may be routed. In step S354, it is determined whether any of the virtual agent groups obtained in step S352 are protected virtual agent groups to be excluded from being added to the pool of selected agents.

A virtual agent group, and therefore, agents constituting the virtual agent group, may be protected from being added to the pool of selected agents because the agents may have specialized or protected skills that are particularly relevant with respect to a different task and because there are fewer than a threshold number of agents available in the virtual agent group. For example, a virtual agent group including technical support agents would be protected from being added to a pool of selected agents for servicing a call having a task of paying a bill by telephone, if there are less than 20 technical support agents available in the virtual agent group. The virtual agent group including technical support agents is protected because the technical support agents' skills are particularly relevant with respect to servicing calls having a task of resolving product issues and because there are not enough technical support agents in the virtual agent group to spare for servicing calls of different task types.

In step S356, the targeted agents are added to the pool of selected agents. The process subsequently continues to step S358 in which announcements are played for the caller, while waiting for the call to be serviced by an agent from the pool of selected agents. While announcements are played for the caller, a wait value timer is set. After the announcements are played, the process continues to step S360 whether an agent in the pool of selected agents is available to service the call. If an agent in the pool of selected agents is available to service the call, the process continues to step S364 in which the call is routed to an agent. The call is routed to the agent based on the service priority. For example, a new order call may have a service priority that is three times higher than the service priority than a billing inquiry call. Thus, the agent will service the new order call before the billing inquiry call. Otherwise, the process continues to step S362 in which it is determined whether the timer has expired in waiting for the call to be serviced. If the timer has expired, the current skill level is incremented and the process repeats from step S352. Otherwise, the process returns to step S360.

Returning to step S348, if no agents are available at a current skill level, the process continues to step S366 in which it is determined whether the current skill level is the least capable skill level with respect to the task. The process continues to step S368 if it is determined that the current skill level is not the least capable skill level. If the current skill level is the least capable skill level, the process continues to step S352. In step S368, it is determined whether the maximum jump setting is greater than the current skill level. If the maximum jump setting is greater than the current skill level, it is possible to increment the current skill level. In other words, it is possible to "skip" the waiting time at the current skill level and move to a lower skill level, or to the next consecutive lower skill level. If the process determines that the maximum jump increase to the current skill level is at a maximum, the process continues to step S352. Otherwise, the current skill level is incremented and the process repeats starting at step S348.

The current skill level may be incremented by more than one so as to skip the waiting time associated with a virtual agent group at the current skill level and so as to skip the waiting time associated with a virtual agent groups at lower skill levels. If the waiting time for servicing the call by an agents at the current skill level is greater than a threshold or based on input from a user, the waiting time for the agents in the virtual agent group at the current skill level is skipped and the current skill level is incremented. The threshold defines a maximum tolerable waiting time and may be set by an administrator of the system. The agents at the current skill level are still added to the pool of selected agents when the target list is obtained in step S352.

In one embodiment, the components and steps of the present disclosure are a routing model template for skills-based routing of communication and may be implemented as rules applied to a graphical user interface (GUI). In another embodiment, the rules are changed in real-time. In yet another embodiment, a user interacts with the graphical user interface to change the rules. For example, the user may choose to change the routing procedure if the response center is closed due to a natural disaster.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A skills-based method for routing an incoming communication, comprising:
    determining, by a task processor, a task associated with the incoming communication;
    determining whether agents of a particular skill level are available;
    determining, when no agents of a particular skill level are available, whether a set skill level is equal to a least capable skill level to perform the task;
    routing the incoming communication, based on the task, to be serviced by a pool of selected agents comprising agents from a first virtual group;
    adding agents from a second virtual group to the pool of selected agents when the incoming communication has not been serviced before a waiting time for servicing the incoming communication exceeds a predetermined time;
    adding agents from a third virtual group to the pool of selected agents when the incoming communication has again not been serviced before a reset waiting time for servicing the incoming communication exceeds the predetermined time;
    determining an existence of a protected virtual group; and
    preventing agents from the protected virtual group from being added to the pool of selected agents when there are less than a predetermined number of available agents in the protected virtual group,
    wherein the protected virtual group is comprised of agents of a protected skill, and
    wherein the agents of the protected skill are assessed to have a first skill level in accomplishing a second task,
    wherein the first virtual group is comprised of agents assessed to have a first skill level in accomplishing the task,
    wherein the second virtual group is comprised of agents assessed to have a second skill level in accomplishing the task,
    wherein the third virtual group is comprised of agents assessed to have a third skill level in accomplishing the task,
    wherein the agents comprising the third virtual group are less skilled in accomplishing the task than the agents comprising the first virtual group and the agents comprising the second virtual group, and
    wherein a waiting time at the set skill level associated with the task is skipped when the set skill level is not the least capable skill level with respect to the task and when a maximum increment setting is greater than the set skill level.

2. The skills-based method according to claim 1, wherein the predetermined time is based on the task.

3. The skills-based method according to claim 1, wherein the predetermined time is different for each virtual group.

4. The skills-based method according to claim 1, wherein an available agent from the pool of selected agents services the incoming communication.

5. The skills-based method according to claim 1,
wherein the first virtual group is comprised of agents assessed to have a first skill level in accomplishing the task.

6. The skills-based method according to claim 5,
wherein the second virtual group is comprised of agents assessed to have a second skill level in accomplishing the task.

7. The skills-based method according to claim 6,
wherein agents comprising the second virtual group are less skilled than agents comprising the first virtual group in accomplishing the task.

8. The skills-based method according to claim 1,
wherein the waiting time is skipped when the predetermined time is zero.

9. The skills-based method according to claim 8,
wherein the waiting time is skipped based on the task.

10. The skills-based method according to claim 1, further comprising:
determining a service priority for the incoming communication.

11. The skills-based method according to claim 10,
wherein the incoming communication is serviced by an available agent from the pool of selected agents based on the service priority.

12. A system for routing an incoming communication, comprising:
a receiver that receives the incoming communication;
a task processor that determines a task associated with the incoming communication; and
a skills-based routing logic processor that determines whether agents of a particular skill level are available, that determines, when no agents of a particular skill level are available, whether a set skill level is equal to a least capable skill level to perform the task, and that determines a pool of selected agents comprising agents assessed to have a first skill level to service the incoming communication, based on the task, that adds agents assessed to have a second skill level to the pool of selected agents when the incoming communication has not been serviced before a waiting time for servicing the incoming communication exceeds a predetermined time, that adds agents from a third virtual group to the pool of selected agents when the incoming communication has again not been serviced before a reset waiting time for servicing the incoming communication exceeds the predetermined time, that determines an existence of a protected virtual group, and that prevents agents from the protected virtual group from being added to the pool of selected agents when there are less than a predetermined number of available agents in the protected virtual group,
wherein the protected virtual group is comprised of agents of a protected skill, and
wherein the agents of the protected skill are assessed to have a first skill level in accomplishing a second task,
wherein the first virtual group is comprised of agents assessed to have a first skill level in accomplishing the task,
wherein the second virtual group is comprised of agents assessed to have a second skill level in accomplishing the task,
wherein the third virtual group is comprised of agents assessed to have a third skill level in accomplishing the task,
wherein the agents comprising the third virtual group are less skilled in accomplishing the task than the agents comprising the first virtual group and the agents comprising the second virtual group, and
wherein a waiting time at the set skill level associated with the task is skipped when the set skill level is not the least capable skill level with respect to the task and when a maximum increment setting is greater than the set skill level.

13. The system according to claim 12,
wherein the incoming communication comprises one of a telephone call, a facsimile, an electronic mail, an internet posting, a chat client message, an offline message and a short messaging system (SMS) message.

14. The system according to claim 12,
wherein the incoming communication is received via a mode of communication comprising one of telephony, wireless communication, internet communication and cellular communication.

15. The system according to claim 12, further comprising:
a graphical user interface (GUI) operable, by a user of the system, to set the predetermined time.

16. A non-transitory computer readable storage medium encoded with an executable program for skills-based routing for an incoming communication and that, when executed by a processor, causes the processor to perform operations comprising:
determining a task associated with the incoming communication;
determining whether agents of a particular skill level are available;
determining, when no agents of a particular skill level are available, whether a set skill level is equal to a least capable skill level to perform the task;
routing the incoming communication, based on the task, to be serviced by a pool of selected agents comprising agents assessed to have a first skill level from a first virtual group;
adding agents assessed to have a second skill level from a second virtual group to the pool of selected agents when the incoming communication has not been serviced before a waiting time for servicing the incoming communication exceeds a predetermined time;
adding agents from a third virtual group to the pool of selected agents when the incoming communication has again not been serviced before a reset waiting time for servicing the incoming communication exceeds the predetermined time;
determining an existence of a protected virtual group; and
preventing agents from the protected virtual group from being added to the pool of selected agents when there are less than a predetermined number of available agents in the protected virtual group,
wherein the protected virtual group is comprised of agents of a protected skill, and
wherein the agents of the protected skill are assessed to have a first skill level in accomplishing a second task,
wherein the first virtual group is comprised of agents assessed to have a first skill level in accomplishing the task,
wherein the second virtual group is comprised of agents assessed to have a second skill level in accomplishing the task,
wherein the third virtual group is comprised of agents assessed to have a third skill level in accomplishing the task,
wherein the agents comprising the third virtual group are less skilled in accomplishing the task than the agents comprising the first virtual group and the agents comprising the second virtual group, and wherein a waiting time at the set skill level associated with the task is skipped when the set skill level is not the least capable skill level with respect to the task and when a maximum increment setting is greater than the set skill level.

\* \* \* \* \*